US005579074A

United States Patent [19]
Knecht et al.

[11] Patent Number: 5,579,074
[45] Date of Patent: Nov. 26, 1996

[54] INTEGRATED PHOTOGRAPHIC PROCESSING SYSTEM AND PROCEDURE FOR OPERATING THE SYSTEM

[75] Inventors: Hugo Knecht, Schöfflisdorf, Switzerland; Ennio Pessot, Pordenone, Italy

[73] Assignee: Gretag Imaging AG, Regensdorf, Switzerland

[21] Appl. No.: 337,820

[22] Filed: Nov. 8, 1994

[30] Foreign Application Priority Data

Nov. 8, 1993 [CH] Switzerland .................. 3344/93

[51] Int. Cl.$^6$ ............................................ G03D 3/08
[52] U.S. Cl. ...................... 396/622; 396/617; 396/646
[58] Field of Search .................................... 354/310–314, 354/319–322, 324, 339; 226/24, 42, 113, 114, 118, 119, 189; 242/364.2, 417.2, 417.3

[56] References Cited

U.S. PATENT DOCUMENTS

| | | | |
|---|---|---|---|
| 4,782,354 | 11/1988 | Gregoris | 354/322 |
| 4,864,354 | 9/1989 | Crasnianski | 355/27 |
| 5,237,359 | 8/1993 | Rosenberg et al. | 354/319 |
| 5,307,114 | 4/1994 | Nitsch et al. | 355/29 |
| 5,463,440 | 10/1995 | Panontin et al. | 354/319 |

FOREIGN PATENT DOCUMENTS

| | | |
|---|---|---|
| 0157214 | 9/1985 | European Pat. Off. . |
| 0246408 | 11/1987 | European Pat. Off. . |
| 0437814 | 7/1991 | European Pat. Off. . |
| 4126578 | 8/1991 | Germany . |

OTHER PUBLICATIONS

European Search Report 92506, May 19, 1994, 3 pages.

*Primary Examiner*—D. Rutledge
*Attorney, Agent, or Firm*—Burns Doane Swecker And Mathis

[57] ABSTRACT

An integrated photographic processing system is equipped with a series of processing stations that are all arranged inside a shared housing. These include an input station for undeveloped, exposed roll film, e.g., miniature film coiled in film magazines. In this input station the inserted roll films are uncoiled and fed into a film conveyance system of an adjacent film processor. In the film processor, the photographic films are developed. At the output of the film processor, a projection printer is arranged for image-by-image exposure onto photographic paper of negatives contained on the developed film. The projection printer is equipped with its own conveyance system for the developed film. Finally, there are also a paper processor for developing the exposed photographic paper, and output stations for the developed film and the developed paper images. Between the output of the film processor and the projection printer, an intermediate storage is arranged for developed individual films; this storage is equipped with an automatic conveyance device for transferring the developed individual films to a film stage of the projection printer, and this conveyance device can be operated independently of the conveyance systems of the film processor and the projection printer. In an operating procedure according to the invention, the developed films are completely removed from the film conveyance system of the film processor before further processing and are deposited in the intermediate storage. From there, they are then advanced by the automatic conveyance device of the intermediate storage to the projection printer.

17 Claims, 3 Drawing Sheets

INTEGRATED PHOTOGRAPHIC PROCESSING SYSTEM AND PROCEDURE FOR OPERATING THE SYSTEM

BACKGROUND OF INVENTION

The invention refers to an integrated photographic processing system as well as a procedure for operating the system.

Integrated photographic processing systems, known as micro labs, combine the functions of film development, copying the negatives onto photographic paper, and paper development in a compact apparatus. Such compact apparatuses are typically used in decentralized manner directly at photo sales locations where not many photo orders are placed. These locations can be supermarkets that run the photo business as a secondary business, for example, or photo and electronics shops that are primarily oriented toward the hardware business (films, cameras) and only process a relatively small portion of customers' orders themselves. Since these apparatuses are in many cases operated by operating personnel with only little experience, a method of processing the photo orders that is as fully automatic as possible and takes place in only one working step is desired. With the known apparatuses of this type, the customer's not yet developed, exposed film in the original film magazine is inserted into the apparatus and the operator obtains as primary product the developed film and the completely copied and developed pictures. All processing steps required for this, from retrieving the film from the film magazine, through developing the film, to exposing the negatives onto photographic paper and developing the exposed photographic paper, are carried out in fully automatic manner inside the apparatus.

Such a single-step, integrated photo processing apparatus is described in U.S. Pat. No. 4,864,354, for example. In this single film processing apparatus, the output of the film processor is closely linked to the film stage of the projection printer, i.e., what is known as the printer. In particular, the copying light source and the photographic filter installation for producing color copies are arranged immediately after the output of the film processor. The light coming from the copying light source and transmitted by the negative is deflected with the help of two minors and directed onto the still unexposed photographic paper. This paper is provided at the input of the paper processor, which is arranged parallel to the longitudinal extent of the film processor. This arrangement with deflecting mirrors is highly sensitive to soiling and jolts, and this can have a negative effect on image sharpness.

Because of the required compactness of integrated photographic processing apparatuses, the individual component groups are very difficult to access. This is all the more true for this known apparatus. Because of the close coupling of the film stage of the printer with the output of the film processor, in particular the optic component groups are very difficult to reach for maintenance and adjustment. For example, the mirrors with which the copying light is directed onto the photographic paper must be periodically cleaned. In addition, it may be necessary to readjust these mirrors from time to time. The close linking of the film stage of the printer to the output of the film processor also makes it necessary to have the conveyance systems of the printer and the film processor linked very closely with one another. Of course, a loop buffer is provided at the input of the printer, which serves to compensate variations in the processing speed of the printer, for example due to longer exposure times for optically denser negatives. Yet this loop buffer does not constitute a proper decoupling of the two conveyance systems. While it is being processed, the film is always guided either by the conveyance system of the film processor or of the printer, and by both conveyance systems for a certain time. If a customer only wants his film developed, there is therefore no possibility with this known apparatus to simply withdraw the developed film from the apparatus at the output of the film processor; rather the film must be conveyed through the printer section. In the process, the operating personnel must make sure to control the printer in timely manner in such a way that no copies will be produced. If this controlling is carded out properly and in timely manner, the capacity of the printer is still unnecessarily occupied by the conveyance of the film through it while the printer is "idling".

This close linking of the film stage of the photographic printer with the output of the film processor is particularly disadvantageous in that it makes a two-phase mode of operation much more difficult, i.e., the processing of subsequent orders, enlargement orders or corrections of the first run through the system. With these known apparatuses it is indeed also possible to process subsequent orders or enlargement orders, but this requires complicated film insertion systems and relatively costly constructions of the projection lens, to be able to set the different enlargement scales. For this reason, the known apparatuses are typically only configured for processing a single paper format. A previously developed film strip of the subsequent order is loaded into the apparatus via the film output opening at the printer portion. For this, the film conveyance system of the apparatus must be operated in an inverse direction until the film strip arrives at a loop buffer provided at the input of the printer. Then the conveyance mechanism is operated in the usual conveyance direction again. While the copies are being produced, the operating personnel cannot verify the proper position of the negatives and they are unable to correct this position. Since, when processing a subsequent order, further processing of the developed film of a first run ejected at the output of the film processor would obviously be delayed, one must wait until the film processor is empty before inserting already developed film strips of a subsequent order. Otherwise, the film of the first run would remain in the film processor too long and would be destroyed.

A further disadvantage with the known apparatuses lies in the fact that they are only designed to produce a single image per negative. If a customer wants several prints of a negative, with the known apparatuses the film strip must be inserted with the concerned negative into the apparatus a corresponding number of times. This operation is highly unsatisfactory since it clearly limits the capacity of the apparatuses.

All of these disadvantages of the apparatuses of the prior art require considerable attention on the part of the operating personnel, in such a way that the actual purpose of such integrated photographic processing apparatuses, namely the ability to also operate them with less experienced operating personnel, is lost. In addition, because of the very close spatial linking of the film processor to the film stage of the photographic printer, corrosion caused by the chemicals of the film processor can occur in the sensitive printer section.

SUMMARY OF INVENTION

The task of the present invention is therefore to create an integrated photographic processing system in which first runs can be processed in a single phase, but in which it is also easily possible to have a two-phase mode of operation, as is required for processing subsequent orders, for enlargements or for corrections of the first run. The insertion of film strips from subsequent orders should be possible at practically anytime, independently of the degree of processing of a film to be developed in the film processor. The printer module should be easily accessible for the operating personnel and should allow them to verify the proper position of the negatives of subsequent orders and of first runs and, where necessary, to correct this position. In addition, the projection lens should be easily accessible in order to easily set different enlargement scales. Above all, it should also be possible to expose different photographic paper formats. The danger of corrosion of elements of the photographic printer by chemicals from the film processor should be avoided. The individual modules of the integrated photographic processing apparatus should be easily accessible for maintenance and cleaning work. The processing of customer orders in which a customer only wants film developed without making prints should be possible without restricting the throughput capacity of the printer. Altogether, an integrated photographic processing system is desired that has a modular construction, is easy to operate, and can be controlled without restrictions in single-phase as well as in two-phase operation. The system should also be able to be reliably operated by less experienced personnel.

The solution of all these and further related tasks is provided by an integrated photographic processing system and a process for operating the integrated photographic processing system according to the invention.

An integrated photographic processing system according to the invention comprises a series of processing stations that are arranged inside a shared housing. These include an input station for not yet developed, exposed roll film (miniature film coiled in film magazines, for example), in which the inserted roll films are uncoiled and fed into a film conveyance system of an adjacent film processor. The photographic films are developed in the film processor. Arranged at the output side of the film processor is a projection printer for image-by-image exposure onto photographic paper of negatives contained on the developed film. The projection printer is equipped with its own conveyance system for the developed film. Finally, there are also a paper processor for developing the exposed photographic paper and an output station for the developed film and the developed paper images. Between the output of the film processor and the projection printer, an intermediate storage is arranged for developed individual films. This storage is equipped with an automatic conveyance device to transfer the developed individual films to a film stage of the projection printer, and this conveyance device can be operated independently of the conveyance systems of the film processor and the projection printer.

Through this constructive measure, the conveyance systems of the film processor and the projection printer are completely decoupled. Yet the compact dimensions of the integrated processing system are maintained. The film stage of the projection printer is spatially separated from the output of the film processor. In this way, one can dispense with costly mirror constructions susceptible to soiling and jolting, and the projection lens can be installed at an easily accessible point in such a way that it is very easy to set other enlargement scales or to insert film strips of subsequent orders into the film stage. One can also dispense with costly conveyance mechanisms and controls to reverse the conveyance direction. The intermediate placing of a storage for the developed films, itself equipped with a fully autonomous, automatic conveyance system, easily allows for single-phase operation as well as two-phase operation in the case of enlargements and/or subsequent orders. One no longer needs to wait until a film has run through the film processor, but rather the film strips of the subsequent order can be inserted into the film stage at any time. If a customer only wants a film developed or if, for other reasons, no copies are to be produced for an order, the developed film can be easily removed from the intermediate storage. Operating errors by the operating personnel, which may result in excessive processing of the film in the projection printer, are avoided in this way and the capacity of the projection printer is no longer unnecessarily burdened in this case and can be utilized for processing subsequent orders, for example.

In an exemplary embodiment, the intermediate storage comprises a holder for a conveyance card connected with the advancing front edge of the film, and a vertical shaft to receive the developed individual films. In this embodiment, the front edge of each film is connected automatically or manually with a conveyance card, for example in the input station before it runs through the film processor. Then the conveyance of the film does not take place by rollers engaging in the area of the film perforations, but rather the conveyance card, which can also be equipped with perforations, is conveyed. The considerable advantage of this is that films damaged in the area of the perforations can be conveyed without problems. In the film processor, conveyance problems due to damaged film perforations, for example, can have a disastrous effect. At the worst, the film may be destroyed.

At the output of the film processor, the conveyance card is deposited into the holder while the attached length of film falls into a vertical shaft. The conveyance cards are advanced by the conveyance device toward the projection printer in such a way that at any given time, a following conveyance card arranged over it imbricately appears shifted toward the film processor output, while the individual films connected to the conveyance cards are pulled up out of the shaft step-wise as the conveyance cards are advanced. This embodiment of the intermediate storage is extremely easy to produce and requires very little additional space.

The longitudinal edges of the conveyance cards are preferably provided with perforations situated opposite each other, into which the conveyance devices of the film processor and the intermediate storage can engage. In the intermediate storage, the conveyance cards are advanced step-wise by specially designed forward-feed means. In the process, the conveyance cards are always advanced by a distance that corresponds to the distance between two successive perforations. In the process, the conveyance cards lying one over the other imbricately are deposited in such a way that the perforations of the individual cards lie over each other. In this way, the conveyance cards lying imbricately shifted one over the other are advanced together until the lowest card is grasped by a pair of conveyance rollers at the output of the intermediate storage and is advanced toward the printer. The advantage of the conveyance card lies in the fact that conveyance of the film in the intermediate storage does not take place by forward-feed means engaging the perforations of the film itself, but rather the forward-feed means engage the perforations on the longitudinal edges of the conveyance cards. In this way, films with damaged perforations can also be conveyed without problems. When the lowest conveyance card is grasped by the pair of conveyance rollers at the output of the intermediate storage, the remaining conveyance cards are still grasped by the forward-feed means and retained by them, while the film connected to the lowest conveyance card is pulled out.

In an exemplary embodiment, the forward-feed means of the conveyance device in the intermediate storage have teeth that are attached eccentrically on a rotating shaft arranged under the holder, in such a way that with each rotation of the shaft, they can be brought to engage the openings on the longitudinal edges of the conveyance cards and advance the conveyance cards toward the projection printer by the distance between two openings.

The width of the shelf-like holder is only slightly greater than the width of the conveyance card. Its length is such that a series of cards, e.g., up to five cards, can be deposited one over the other imbricately. The length of the holder is preferably not more than twice the length of the conveyance card. In this way, the need for space is kept low and a relatively large number of conveyance cards with developed individual films or film strips hanging on them can be arranged one over the other imbricately. This is advantageous for example when, for whatever reasons, the operation of the projection printer must be interrupted. In this case, the further insertion of undeveloped roll films or the insertion of film strips that are first connected to a conveyance card does not have to be interrupted; rather the intermediate storage represents an additional buffer into which the developed films or film strips can be deposited in the meantime. In the process, the developed films deposited in the intermediate storage are always expelled already from the conveyance system of the film processor but are not yet threaded into the conveyance system of the projection printer. When the projection printer resumes operation, it is served from the intermediate storage. In the process, it can be operated at the fastest possible work speed in order to work off the back-up. This is particularly easy because, last but not least, the conveyance means of the film processor, the conveyance device of the intermediate storage, and the film conveyance means of the projection printer can be operated and can have their speeds adjusted completely independently of each other.

At the output of the intermediate storage, but before the film stage of the projection printer, there is a cutting device for separating the conveyance card from the advancing front edge of the developed film and a removal device for the separated conveyance cards, which is connected to a collecting container for the conveyance cards. From there, the conveyance cards can be conveyed back to the input station of the apparatus, where they can be reused. This can be carded out fully automatically or manually by the operating personnel.

In an exemplary embodiment, the intermediate storage along with its related conveyance means is designed as a module than can be optionally loaded into and removed from the film path. In this way, the user can decide for himself if he wants to utilize the advantages of the intermediate storage or if he would rather operate the apparatus in a two-phase process. In the latter case, the developed film is removed at the output of the film processor by the operating personnel and manually inserted into the film stage of a separate copying apparatus for special enlargements, for example.

It is preferable to use conveyance cards that serve simultaneously as information carriers. The information is coded on the conveyance cards as perforations. The holder is equipped with a punched-card reader which deciphers the information coded on the conveyance cards. In this way, the apparatus can be informed that a specific film should only be developed. When the conveyance card of this film is deposited into the holder, the punched-card reader recognizes the corresponding information and forwards this information to the control unit. The forward-feed means in the holder are not put into operation and a signal is created for the operating personnel signalling that a film has been deposited into the intermediate storage that can be removed. Other conveyance cards can contain the information that two copies should be produced of each master. In this case, the printer will be controlled accordingly. As additional help for the operating personnel, the conveyance cards each have a different color along with the typical standard information. In this case, the operating personnel does not have to decipher the coded information on the conveyance card, but rather they can select the cards using the color and load them, with the roll film contained in the film magazine, into the input station.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
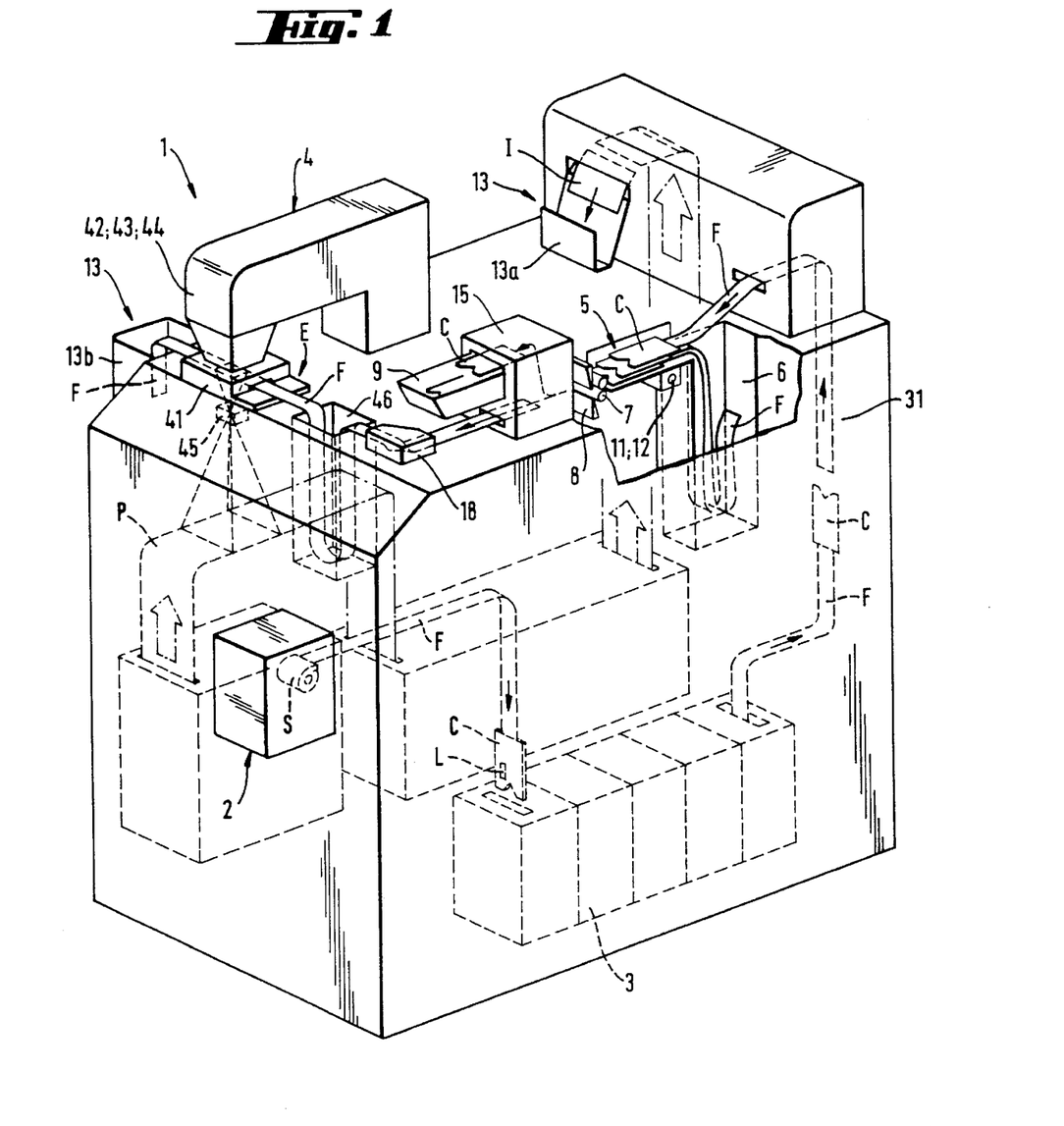
FIG. 1 shows a processing system according to the invention.

In the integrated photographic processing system illustrated in FIG. 1 and designated collectively by ref. no. 1, all processing stations for the film F and for the photographic paper P are housed in a single housing. For reasons of clarity, the illustrations in FIG. 1 and in the subsequent figures are each limited to that film path of the integrated photographic processing system 1 that is necessary to understand the invention. The individual processing stations of the photographic processing system 1 essentially comprise an input station 2 for not yet exposed roll film, usually miniature film of the 135 format coiled in film magazines S, a film processor 3 that has various chemical tanks, a projection printer 4, a schematically indicated paper processor which typically extends roughly parallel next to the film processor 3, and an output station 13 for the developed film F and one for the developed paper images P. The exposed films F in the film magazines S are removed from the film magazine S in the input station 2 and threaded into a conveyance system that conveys the not yet developed, exposed negative films F through the chemical tanks of the film processor 3. In the film processor, the films F run through various developing, bleaching, fixing and rinsing baths and in this way are developed and then dried in a drier 31 belonging to the film processor 3. After this, the developed films F are conveyed to the projection printer 4 and there they are exposed onto light-sensitive photographic paper P. The exposed photographic paper P is conveyed through a paper processor in which it runs through various developing, fixing and rinsing baths in order to develop the images. The completely developed images I and the related developed films F are finally released from the integrated photographic processing system via corresponding output stations 13a for the images or output stations 13b for the film. Thus far, the integrated photographic processing system 1 corresponds to the apparatuses known from the prior art.

Unlike the known apparatuses, an intermediate storage 5,6 for the developed films F is arranged in the film path between the film processor 3 and the projection printer 4. The intermediate storage 5,6 decouples the projection printer 4 and the film processor 3. The developed films F are not forwarded immediately at the output of the film processor 3 to the projection printer for image-by-image exposure onto the photographic paper P; instead they are first deposited in the intermediate storage 5,6. In the process, the developed films F are completely removed from the conveyance system of the film processor 3. While they remain in the intermediate storage 5,6, they are not grasped by the conveyance system of the film processor 3 nor by that of the projection printer 4.

Figure 2:
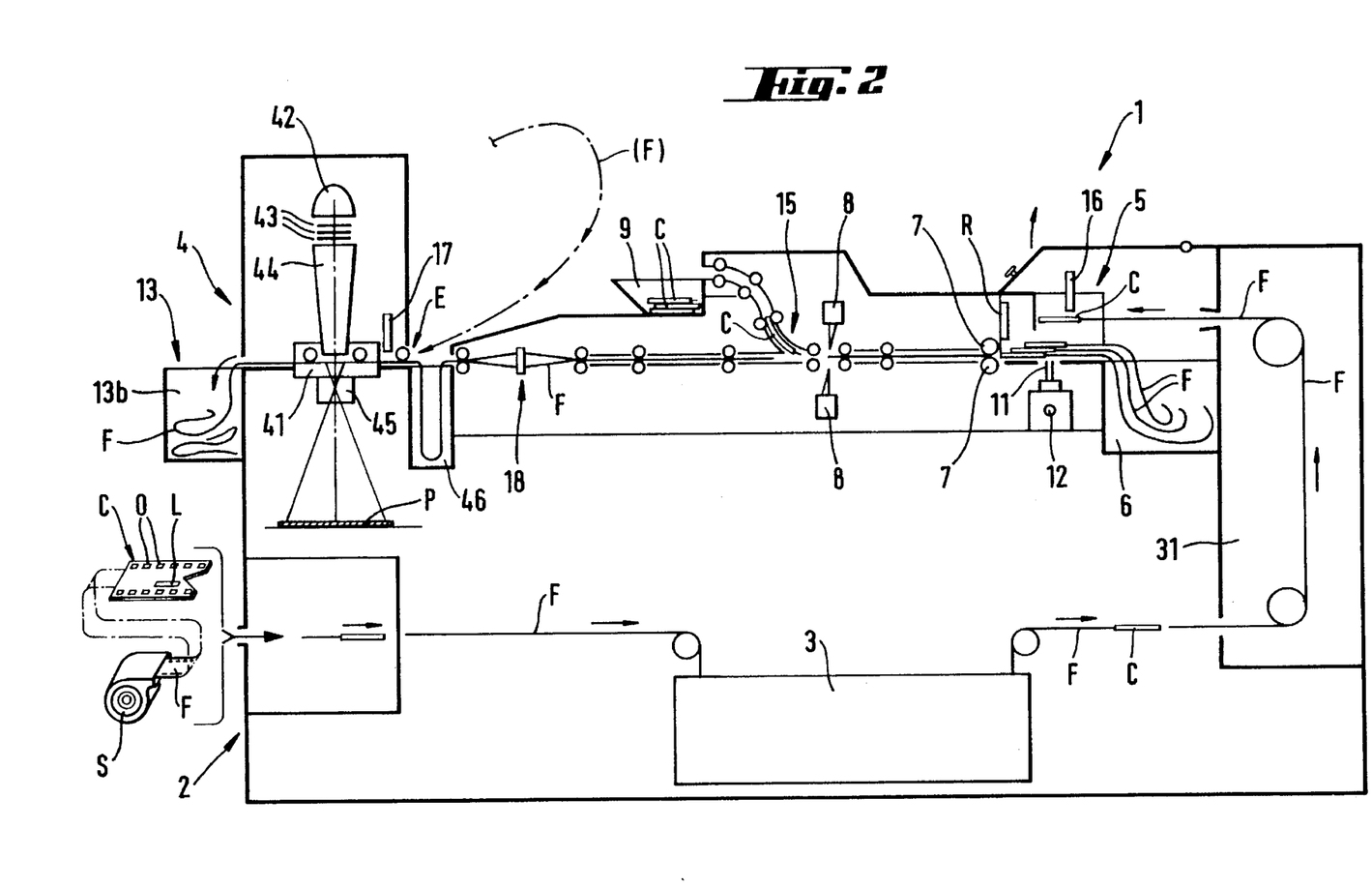
FIG. 2 shows a diagram of the processing system.

In FIG. 2, the film path of the integrated photographic processing system 1 is illustrated in detail. The not yet developed, exposed negative film F is connected in the input station 2 to a conveyance card C. For this, the advancing front end of the film F is glued to the small end of the conveyance card C. The conveyance system of the film processor grasps the conveyance card C and pushes it forward. In this way, the film F is conveyed through the film processor 3. At the output of the film processor 3, the conveyance card C is deposited into a shelf-like holder 5 while the now developed film F fails into a vertical shaft 6.

Figure 3:
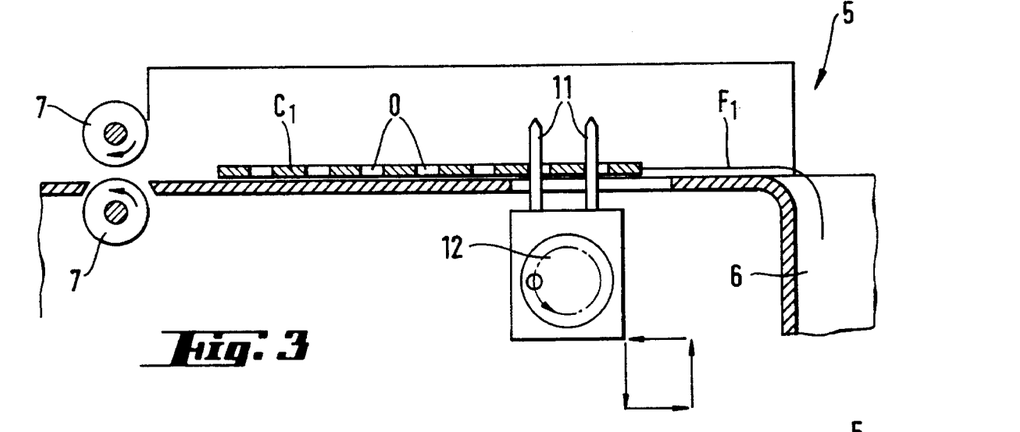
FIGS. 3–5 show the further conveyance of developed films deposited in an intermediate storage.

The intermediate storage 5,6 is equipped with its own conveyance system. This comprises conveyance means for the conveyance cards C and a series of conveyance rollers for the film. The conveyance means 11,12 in the holder first make sure that the deposited conveyance card C is advanced step-wise toward a film stage 41 of the projection printer 4. In this way, the next deposited conveyance card C appears, in relation to the card in front, imbricately shifted toward the rear. This is illustrated more precisely in FIGS. 3–5 in three different phases. There one can see that the conveyance cards $C_1$–$C_3$ each have openings or perforations O on their longitudinal edges. FIG. 3 shows a first conveyance card $C_1$ in the shelf-like holder. The film $F_1$ connected to the first conveyance card $C_1$ hangs down into the shaft. The conveyance means assigned to the holder comprise forward-feed means 11,12 that can be brought to engage the perforations O and in this way advance the conveyance card C step-wise. According to the illustrated embodiment, the forward-feed means have teeth 11 that are attached eccentrically on a rotating shaft 12 arranged under the holder 5, in such a way that with each rotation of the shaft 12, they engage openings O on the opposite longitudinal edges of the conveyance card and push the conveyance cards further by a distance that corresponds to the distance between two consecutive openings. In the process, the shaft is driven by a separate drive motor 14 (FIG. 2). The holder 5 for the conveyance cards is only slightly wider than the conveyance cards; it is longer than a conveyance card by several perforation intervals; and it is roughly twice as long at most. In this way, the conveyance cards can be deposited very well and are laterally guided. The selected length of the holder 5 makes it possible to deposit a relatively large number of conveyance cards.

Figure 4:
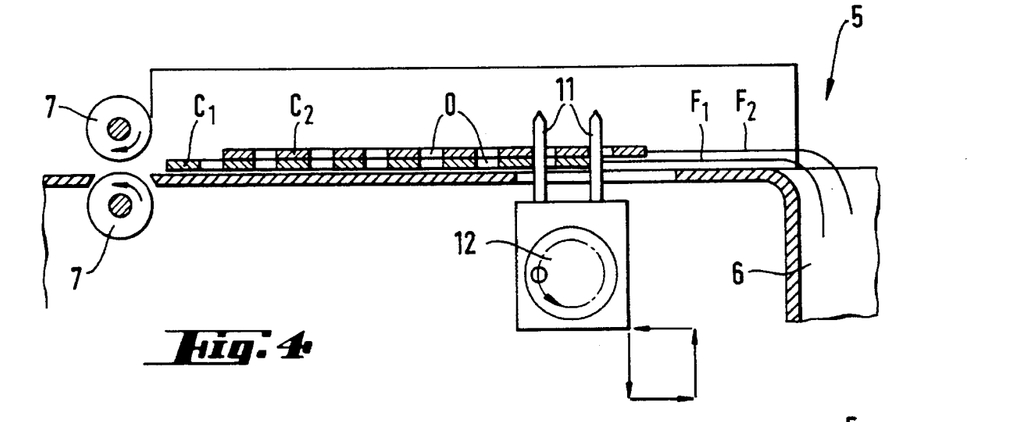

FIG. 4 shows the first conveyance card $C_1$ already advanced by a certain distance. A second conveyance card $C_2$ with a second film $F_2$ attached to it is deposited over it. In the process, the openings O in the longitudinal edges of the conveyance cards are respectively congruent. The forward-feed means 11, 12 are shown engaged in the openings O. One can see that the teeth 11 push into the openings of both conveyance cards $C_1$, $C_2$. In this way, when the shaft 12 rotates, both conveyance cards are advanced together by one step further toward a pair of conveyance rollers 7 at the output of the holder 5, whereby the step difference in the forward-feed of the two conveyance cards is maintained.

Figure 5:
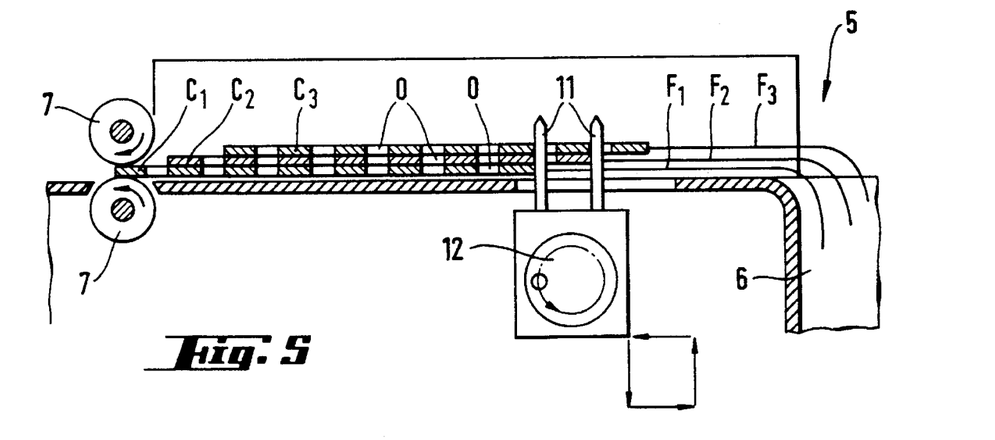

Finally, in FIG. 5 a third conveyance card $C_3$ with a film $F_3$ attached to it is deposited over the two preceding conveyance cards $C_1$, $C_2$. One can in turn see that the openings O on the longitudinal edges of the conveyance cards are respectively congruent. The teeth 11 engage openings of the two uppermost conveyance cards $C_2$, $C_3$, while the lowest conveyance card $C_1$ is pushed at its rear3 small side. In this way, all three conveyance cards are advanced together toward the pair of conveyance rollers 7. The lowest conveyance card $C_1$ is pushed against the pair of conveyance rollers 7. After the shaft 12 has rotated, the drive of the pair of conveyance rollers 7 is started up. In this way, the lowest conveyance card $C_1$ is forwarded and the film $F_1$ attached to it is pulled forth under the two upper conveyance cards $C_2$, $C_3$, while the teeth 11 are still engaged in the openings O of the remaining two conveyance cards $C_2$, $C_3$.

From the pair of conveyance rollers 7, the conveyance card C with the developed film F attached to it is conveyed toward the film stage 41 of the projection printer 4, as shown in FIG. 2. Between the pair of conveyance rollers 7 and the film stage 41 of the projection printer 4, a cutting device 8 is arranged that separates the conveyance card C from the developed film F. The separated conveyance card C is removed from the film path via a switch 15 and conveyed to a collecting container 9. It is practical to place the collecting container 9 near the input station 2, from where the operating personnel can remove it for reuse.

After the conveyance card C is separated, the developed films F are conveyed to the film stage 41 of the projection printer 4 in order to be exposed there image-by-image onto the photographic paper P. A copying light source 42 required for this, color filters 43, a light shaft 44 in which the copying light is accordingly prepared, and a projection lens 45 arranged under the film stage 41 are indicated in FIG. 2. The exposed photographic paper P is developed in the paper processor (not shown); the developed paper images and the developed film can finally be removed at the output station 13 (FIG. 1).

To control the forward-feed of the conveyance cards C or the developed films F, a series of preferably photoelectric sensors are provided in the holder 5, in the film path between the holder and the film stage 41, and in the projection printer 4. Some of the sensors are indicated in FIG. 2. The holder 5 for the conveyance cards C is equipped in particular with a detector 16 that determines whether a conveyance card C is deposited in the holder 5. A further sensor 17 at the input of the projection printer 4 recognizes the rear edge of a film F just processed. If there are one or more conveyance cards C in the holder 5, and if the sensor at the input of the printer gives a signal that the rear end of the film F has passed, the drive motor for the forward-feed means 11,12 in the holder 5 is started. These forward-feed means advance the conveyance card/s C step-wise until the lowest card pushes against the pair of conveyance rollers 7. After the shaft 12 has rotated, the drive of the pair of conveyance rollers 7 is started up. In this way, the lowest conveyance card C is conveyed further and the film F attached to it is pulled under any other conveyance cards that may be lying over it, while the teeth 11 are still engaged in the perforations O of the other conveyance cards. The conveyance card C is finally separated and removed from the film F, while the film F is forwarded to the printer 4.

One can see from the illustration in FIG. 1 that the conveyance directions of the film F in the film processor 3 and in the projection printer 4 are at a 90 degree angle to each other. This results from the individual components of the integrated processing system 1 being arranged to save as much space as possible. In the ninety degree redirecting of the film F, the film is preferably turned simultaneously in such a way that the sensitized side of the film F is facing the sensitized side of the photographic paper. The redirecting and the simultaneous turning of the film F are preferably carried out in a film turning device 18 that is arranged before the film stage 41 of the printer 4.

If there are already developed film strips, for example from a subsequent order or because defective copies were produced in a first run, the integrated photographic processing system 1 according to the invention provides the possibility to place them manually into the film stage 41. Through the decoupled arrangement of the film processor and the projection printer, the latter can be arranged at an easily accessible place in the integrated apparatus. The film stage is easily reachable, the already developed film strips can easily be inserted manually into an input device E arranged at the input of the film stage 41. In the process, the proper position of the negatives can be easily checked and, where necessary, corrected. In this way, a clear, simple operation is possible for processing subsequent orders and for corrections.

The decoupling of the film processor 3 and the projection printer 4 by placing an intermediate storage 5,6 in between makes it possible to operate the aforementioned processing stations independently of each other at their optimal speeds. If, for example, the throughput time in the film processor needs to be changed because, for example, other chemicals are being used, this has practically no effect on the work speed of the projection printer. The forward-feed speed of the conveyance device in the intermediate storage can also be changed without having to change the throughput speed of the film processor or the work speed of the projection printer along with it.

The use of conveyance cards C for conveying the films F through the film processor 3 and through the intermediate storage 5,6 offers a series of advantages. The conveyance of the film F then does not take place by rollers grasping in the area of the film perforations, but rather the conveyance card C, which is also provided with perforations O, is conveyed. The considerable advantage of this is that films damaged in the area of the film perforations can still be conveyed without problems.

It is preferable to use conveyance cards C that serve simultaneously as information carriers. The information is coded on the conveyance cards as perforations L. The holder 5 can be equipped with a punched-card reader R which deciphers the information L coded on the conveyance cards C. In this way, the apparatus can be informed that a specific film F should only be developed. When the conveyance card C of this film F is deposited into the holder 5, the punched-card reader R recognizes the corresponding information L and forwards this information to the control unit. The forward-feed means 11,12 in the holder 5 are not put into operation and a signal is generated for the operating personnel signalling that a film F has been deposited into the intermediate storage 5,6 that can be removed. Other conveyance cards C can contain the information that two copies should be made of each negative. In this case, the printer 4 will be controlled accordingly. As additional help for the operating personnel, the conveyance cards C each have a different color along with the typical standard information L. In this case, the operating personnel does not have to decipher the coded information L on the conveyance card C, but rather they can select the cards C using the color and load them, with the roll film F contained in the film magazine S, into the input station 2.

Because of the decoupling of the film development from the copying process, one can easily change from the single-step process for the first run of a film to the two-step process for subsequent orders and corrections. Urgent subsequent orders can be inserted at any time between the processing of first-run films already entered into the film processor. The projection printer is also spatially separated from the film processor in such a way that corrosion can be avoided. Because the film stage is no longer arranged immediately at the output of, the film processor, it no longer hinders the accessibility of the film chemical section. Costly mirror constructions for conveying the copying light to the photographic paper can be dispensed with. In this way, possible adjusting problems or distortions due to the mirrors are dispensed with. The developed film material can be turned immediately before the film stage in such a way that the sensitized side is in the proper position. While the invention has been described in connection with conveyance cards that are each glued onto the front edge of a film, one skilled in the art will appreciate that the invention can also be executed without such conveyance cards. Once one skilled in the art is informed of teachings of the present disclosure, the constructive conversions required for this are within the ability of one skilled in the art.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Integrated photographic processing system comprising: an input station inside a housing for receiving undeveloped, exposed film and for uncoiling, cutting and feeding the inserted film into a film conveyance system of an adjacent film processor in which the film is developed;

a projection printer arranged at an output of the film processor for image-by-image exposure of negatives contained on the film onto photographic paper;

a paper processor for developing the exposed photographic paper;

an output station for the developed film and for the developed photographic paper, respectively; and an intermediate storage located between an output of the film processor and the projection printer, for storing developed film, said intermediate storage being equipped with an automatic conveyance device for transferring the developed film to a film stage of the projection printer, the conveyance device being operable independently of the conveyance system of the film processor and a conveyance system of the printer, wherein the intermediate storage further comprises:

a holder for at least one conveyance card connected to an advancing front edge of the film, the holder being operable such that plural conveyance cards are deposited into the holder over each other imbricately shifted toward the film processor; and a vertical shaft for receiving developed film connected to the plural conveyance cards.

2. System according to claim 1, wherein the film stage of the projection printer further comprises:

an insertion device for receiving film from subsequent orders.

3. System according to claim 1, wherein the holder is slightly wider than the at least one conveyance card and has a maximum length which corresponds approximately to twice a length of the at least one conveyance card.

4. System according to claim 1, further comprising:

a cutting device, located at an output of the intermediate storage before the film stage of the projection primer, for separating the at least one conveyance card from the advancing front edge of the film; and a removal device for removing the separated conveyance card, said removal device being connected to a conveyance card collecting container.

5. System according to claim 4, wherein the intermediate storage, the conveyance system of the intermediate storage and the conveyance card removal device are formed as a modular component which is removable from the integrated processing system.

6. System according to claim 1, further comprising:

forward-feed means which engage perforations provided on longitudinal edges of the conveyance cards and step-wise advance the conveyance cards in layers, imbricately one over the other, along with films connected to each of the conveyance cards, until a lowest conveyance card butts against a pair of conveyance rollers at an output of the holder.

7. System according to claim 6, wherein the forward-feed means further comprises:

teeth attached eccentrically on a rotating shaft arranged under the holder such that with each rotation of the shaft, the teeth engage the perforations on the longitudinal edges of the conveyance cards deposited one over the other imbricately, said teeth advancing the conveyance cards by a distance which corresponds to the distance between two perforations toward the pair of conveyance rollers.

8. System according to claim 1, wherein the conveyance system of the film processor, the conveyance device of the intermediate storage, and the conveyance system of on printer are operable at speeds adjusted independently of each other.

9. Device according to claim 1, wherein the holder further includes:

a reader for reading information coded on the conveyance cards.

10. Process for operating an integrated photographic processing system in which undeveloped, exposed films are inserted via an input station into the system, comprising the steps of:

uncoiling, cutting and conveying the film through a film processor in which each film is developed and dried;

conveying the developed film to an intermediate storage, from where the films are conveyed with an automatic conveyance device of the intermediate storage to a film stage of a projection printer in which the negatives arranged on the film are exposed image-by-image onto photographic paper;

conveying the exposed photographic paper through a paper processor in which the exposed images are developed;

ejecting the developed films and the photographic paper at corresponding output stations;

connecting an advancing from edge of each film, before it enters the film processor, with a conveyance card;

depositing the conveyance card, after the film exits the film processor, in a shelf-like holder of the intermediate storage;

conveying each card by the conveyance device toward a pair of conveyance rollers such that a following conveyance card is deposited imbricately shifted toward the film processor output, with films connected to the conveyance cards falling into a vertical shaft from which they are pulled step-wise when the conveyance cards are advanced; and step-wise advancing the conveyance cards using perforations situated opposite each other on longitudinal edges of the conveyance cards, forward-feed of the conveyance cards being carried out with eccentrically linked teeth that fit on both side walls of the conveyance cards into the perforations of the conveyance cards lying one over the other, with a forward-feed length corresponding approximately to a distance between two successive perforations.

11. Process according to claim 10, further comprising the steps of:

connecting an advancing front edge of each film, before it enters the film processor, with a conveyance card;

depositing the conveyance card, after the film exits the film processor, in a shelf-like holder of the intermediate storage; and conveying each card by the conveyance device toward a pair of conveyance rollers such that a following conveyance card is deposited imbricately shifted toward the film processor output, with films connected to the conveyance cards falling into a vertical shaft from which they are pulled step-wise when the conveyance cards are advanced.

12. Process according to claim 10, further comprising the steps of:

grasping a lowest conveyance card in the holder at any given time by the pair of conveyance rollers; and advancing the lowest conveyance card, together with a connected film, to the film stage of the projection printer.

13. Process according to claim 12, further comprising the steps of:

separating the conveyance card, before the film stage, from the front edge of the film;

conveying the conveyance card, via a removal system, to a collecting container; and forwarding the film to the film stage.

14. Process according to claim 10, further comprising the step of:

readjusting the film in a path from the intermediate storage to the film stage of the printer at approximately a 90 degree angle, the film being readjusted such that during exposure, a sensitized side of the film is facing a coating of the photographic paper.

15. Process according to claim 10, further comprising the steps of:

inserting already exposed film from subsequent orders via an insertion device into the film stage of the projection printer;

checking a position of the inserted film; and correcting the position where necessary.

16. Process for operating an integrated photographic processing system in which undeveloped, exposed films are inserted via an input station into the system, comprising the steps of:

uncoiling, cutting and conveying the film through a film processor in which each film is developed and dried;

conveying the developed film to an intermediate storage, from where the films are conveyed with an automatic conveyance device of the intermediate storage to a film stage of a projection printer in which the negatives arranged on the film are exposed image-by-image onto photographic paper;

conveying the exposed photographic paper through a paper processor in which the exposed images are developed;

ejecting the developed films and the photographic paper at corresponding output stations; and operating a conveyance system of the film processor, the conveyance device of the intermediate storage, and a conveyance system of the projection printer at speeds which are adjustable independently of each other.

17. An intermediate storage for use with a photographic processing system which develops exposed film and which can print images of the developed film onto photographic paper, said intermediate storage comprising:

a modular housing;

a conveyance device for transferring developed film from an adjacent film processor to a film stage of a projection printer, the conveyance device being operable at a speed which is independent of a speed of a conveyance system of the film processor and a speed of a conveyance system of the projection printer;

a holder for holding at least one conveyance card connected to an advancing front edge of the developed film, said holder being capable of storing plural conveyance cards each of which is connected to a separate developed film, with plural conveyance cards being imbricately shifted relative to one another within said holder; and a vertical shaft for holding the films connected to each of the conveyance cards located in the holder.

* * * * *